United States Patent

[11] 3,633,320

| [72] | Inventors | Mark Davydovich Flid<br>Smirnovskaya ul., 4a, kv. 65;<br>Leonid Grigorievich Dibner,<br>Menzhinskogo, 9, kv. 19, both of Moscow,<br>U.S.S.R. |
|---|---|---|
| [21] | Appl. No. | 776,172 |
| [22] | Filed | Nov. 15, 1968 |
| [45] | Patented | Jan. 11, 1972 |

[54] MACHINE TOOL FOR MACHINING WORKPIECES ALONG A CLOSED VARIABLE-CURVATURE CONTOUR
3 Claims, 1 Drawing Fig.

[52] U.S. Cl............................................... 51/161, 51/101
[51] Int. Cl................................................. B24b 5/00, B24b 17/02
[50] Field of Search............................................ 51/100, 101, 101.1, 161

[56] References Cited
UNITED STATES PATENTS

| 1,915,144 | 6/1933 | Appleton | 51/101 |
| 2,132,949 | 10/1938 | Green | 51/101 |
| 2,334,938 | 11/1943 | Lang | 51/101 |
| 2,883,800 | 4/1959 | Reaser et al. | 51/101 |
| 2,964,885 | 12/1960 | Talbert | 51/101 |
| 3,332,172 | 7/1967 | Stern | 51/101.1 |

*Primary Examiner*—Othell M. Simpson
*Attorney*—Waters, Roditi, Schwartz & Nissen ABSTRACT: A machine tool for machining workpieces along a closed variable-curvature contour and including a grinding wheel. The machine tool comprises a grinding head with a swinging driving frame which carries a grinding wheel and a follower of a profiling attachment interacting with a profile form mounted coaxially with the workpiece being machined.

A specific feature of the invention is the connection of the swinging frame with the drive and the means for moving the profile follower, thus allowing the swinging frame with the grinding wheel and the profile follower to be automatically moved towards and away from the workpiece being machined and the profile form. Another distinctive feature is the swinging of the frame and the constant force with which the grinding wheel is pressed to the workpiece during the machining process. The invention makes it possible to achieve machining accuracy of 0.01 mm.

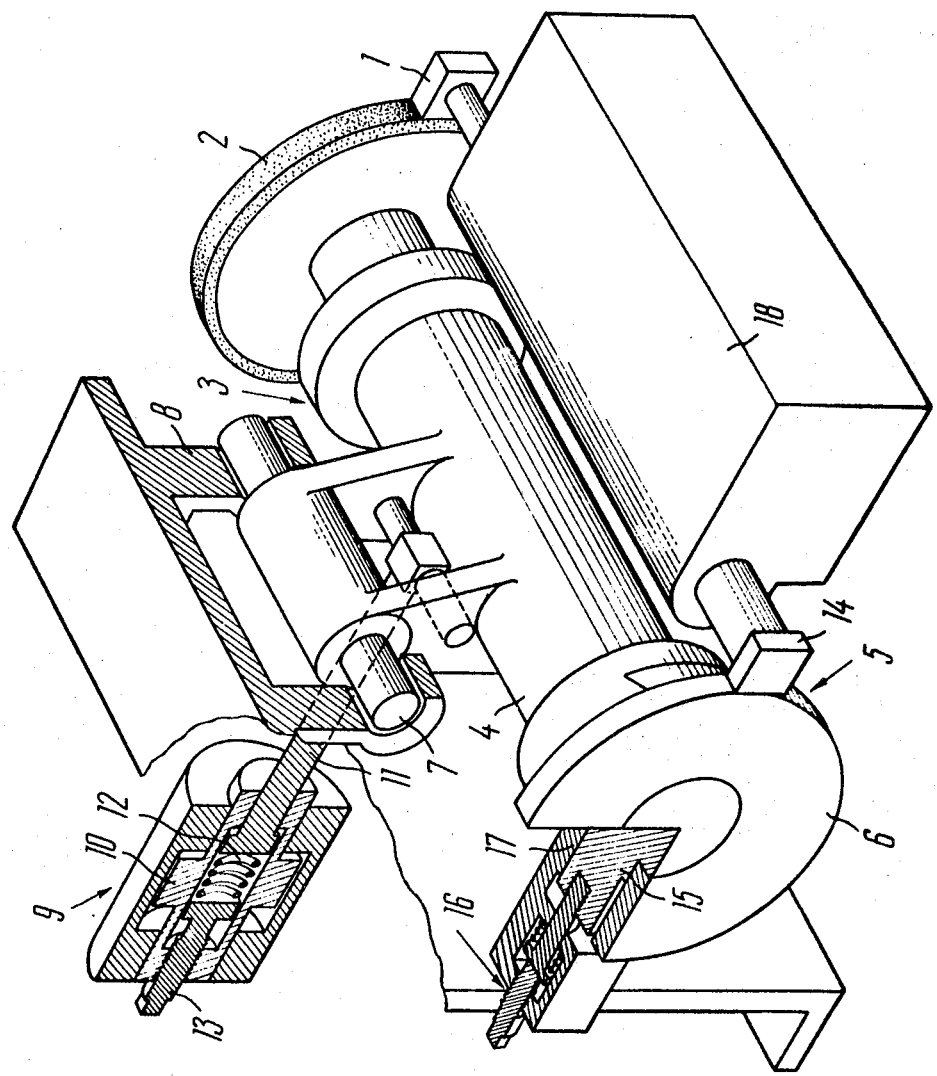

MACHINE TOOL FOR MACHINING WORKPIECES ALONG A CLOSED VARIABLE-CURVATURE CONTOUR

The present invention relates generally to machine tools for machining workpieces along a closed contour of variable curvature by using a grinding wheel, and more specifically to such machines used for machining faces and vertices of polygonal plates; thus, the invention can find utility when used at machine-building works.

There are commonly known machine tools adapted for machining workpieces along a closed contour by means of a grinding wheel. In these machines, however, the workpiece being machined and the profile form are mounted on different kinematically interlinked spindles; therefore, any imperfection of mechanical linkages between the mentioned spindles adversely affects the quality and accuracy of machining.

Moreover, the above-discussed machines incorporate means for crossfeed of the grinding wheel to the workpiece being machined, which complicates their design and may result, due to instability of the cutting properties of the grinding wheel and the physicomechanical properties of the workpiece being machined, in a variation of cutting forces and, consequently, in deteriorating the quality and accuracy of machining.

Total feed values in these machines are adapted to be based upon a maximum stock left for machining. Therefore when machining workpieces with smaller machining allowances, some losses of productive time occur, whereby production capacity of the machine is adversely affected.

It is a general object of the present invention to eliminate the disadvantages mentioned above.

It is a specific object of the present invention to provide a machine tool capable of machining workpieces along a closed contour of variable curvature contour, enabling high quality and accuracy of machining to be obtained and featured by a simpler design and higher capacity as compared to prior art machines of the same type.

Said object is accomplished due to the fact that in a machine tool for machining workpieces along a closed contour of variable curvature by means of a grinding wheel, comprising a profiling attachment, its grinding head incorporates, according to the invention, a swinging frame for supporting both the grinding wheel and the profile follower of the profiling attachment thereon, said frame being associated with its driving mechanism through an elastic member and being provided with guideways for said profile follower of said profiling attachment to travel with respect to the grinding wheel, said profiling attachment featuring its profile form mounted coaxially with the workpiece being machined.

The driving mechanism of the swinging frame can be constituted as a double-action hydraulic cylinder whose rod incorporates a resilient member made as, for example, a spring-controlled plunger piston articulately connected to the swinging frame.

The profile follower of the profiling attachment can be fixed in place on a spring-mounted carriage which is traversable from a screw drive with respect to the grinding wheel along guideways provided on the swinging frame.

Hereafter, the present invention is described in conjunction with an exemplary embodiment with due reference to the accompanying drawing, wherein there is shown a perspective view of a machine tool for machining workpieces along a closed contour of variable curvature by a grinding wheel.

Now referring to the drawing, a machine tool for machining workpieces 1 along a closed contour of variable curvature by using a grinding wheel 2 comprises a grinding head 3 with a swinging frame 4, and a profiling attachment 5.

The swinging frame 4 serves for mounting the grinding wheel 2 and a profile follower 6 of the profiling attachment 5. A support 7 of the swinging frame 4 is made fast in a housing 8 of the machine. The swinging frame 4 has a particular driving mechanism which is essentially a double-action hydraulic cylinder 9 with a plunger 10.

Provision is made in the plunger 10 for a resilient assembly including a rod 11 loaded with a spring 12 whose tension is adjustable by using a screw 13. The spring-loaded plunger 11 of said double-action hydraulic cylinder 9 is pivotably connected to the swinging frame 4.

The profiling attachment 5 of the machine incorporates the profile follower 6 and a profile form 14.

The profile follower 6 of the profiling attachment 5 is fixed on a spring-mounted carriage 15 adapted to travel from a screw drive 16 with respect to the grinding wheel 2 along guideways 17 which are provided on the swinging frame 4. The profile follower 6 and the grinding wheel 2 have featured their equal diameters. The profile follower 6 is adapted to contact the profile form 14 which is mounted in a fixture 18 coaxially with the workpiece 1 to be machined.

The herein-disclosed machine tool for machining workpieces along a closed contour of variable curvature by way of a grinding wheel operates as follows.

The workpiece 1 to be machined is clamped coaxially with the profile form 14 in the fixture 18 mounted on the machine and is then imparted rotary motion.

Next the swinging frame 4, through the intermediary of the double-action hydraulic cylinder 9, causes both the grinding wheel 2 and the profile follower 6 to move into the working zone, the working stroke of the plunger 10 of that cylinder being so adjusted that when the grinding wheel 2 comes in contact with the workpiece 1 being machined, the spring 12 should be compressed solid. With the workpiece 1 rotating, the swinging frame 4 complete with the grinding wheel 2 and the profile follower 6, performs swinging motion about its shaft 7 while following or tracing the profile of the workpiece 1 at the beginning of machining, and that of the profile form 14, at the end of machining. The spring 12 exerts a constant pressure at which the grinding wheel 2 is forced against the workpiece 1 being machined.

Because of a low stiffness of the spring 12 the compression force exerted by the latter upon the grinding wheel 2 to force it against the workpiece 1, manages to remain constant and unaffected throughout the grinding procedure and, consequently, the cutting force is likewise kept invariable.

Upon removing the stock left for machining, the profile follower 6 of the profiling attachment 5 butts against the profile form 14, thereby restricting further metal removal.

Thereupon, the machined workpiece 1 is removed from the machine and the procedure is recycled.

Since the grinding wheel is subject to some wear in the course of its life, provision is made to compensate for its wear which is attained by the fact that the profile follower 6 of the profiling attachment 5 which is fixed on the spring-mounted carriage 15, is free to travel together therewith along the guideways 17 with respect to the grinding wheel 2, motion being imparted thereto from the screw drive 16.

What is claimed is:

1. Apparatus for machining workpieces along a closed variable curvature contour comprising a grinding wheel, a profiling attachment including a profiling follower, a swingable frame carrying both the grinding wheel and the profiling follower of said profiling attachment; drive means for swinging said frame and for pressing the grinding wheel against a workpiece; said drive means including a double-action power cylinder; said cylinder including a hollow piston and a spring-loaded plunger slidably mounted in said piston and articulated to said swinging frame; said plunger including a projection which engages said piston to limit linear displacement of the plunger relative to the piston; means mounting said follower of the profiling attachment on said frame for movement laterally relative to the frame to compensate for wear of said grinding wheel; and a profile form of said profiling attachment interacting with said follower and being mounted coaxially with the workpiece being machined for rotation therewith.

2. Apparatus as claimed in claim 1, comprising a screw threaded into said piston, and a spring interposed between said screw and said plunger, said plunger having one end in contact with said spring and an opposite end pivotably connected to the frame.

3. Apparatus as claimed in claim 1, wherein said swingable frame includes guideways, a movable carriage in said guideways, said profile follower being mounted on said carriage, a spring acting between said carriage and said frame and an adjusting screw threaded into said frame and acting on said carriage.

* * * * *